(Model.)

C. W. ELLIOTT.
LID FOR RECEPTACLES.

No. 400,901. Patented Apr. 9, 1889.

Witnesses.
Lauritz N. Möller
John R. Snow

Inventor.
Charles W. Elliott
by his attorney
J. E. Maynadier

N. PETERS. Photo-Lithographer, Washington, D. C.

UNITED STATES PATENT OFFICE.

CHARLES WINTERBON ELLIOTT, OF BOSTON, MASSACHUSETTS.

LID FOR RECEPTACLES.

SPECIFICATION forming part of Letters Patent No. 400,901, dated April 9, 1889.

Application filed December 19, 1888. Serial No. 294,032. (Model.)

*To all whom it may concern:*

Be it known that I, CHARLES WINTERBON ELLIOTT, a subject of the Queen of Great Britain, residing at Boston, in the county of Suffolk and State of Massachusetts, have invented a new and useful Improvement in Lids for Receptacles, of which the following is a specification, reference being had to the accompanying drawings, in which—

Figure 1:
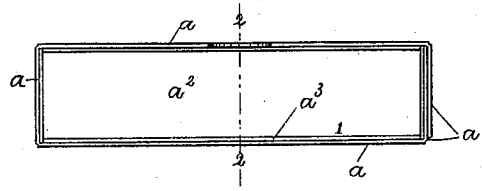
Figure 3:
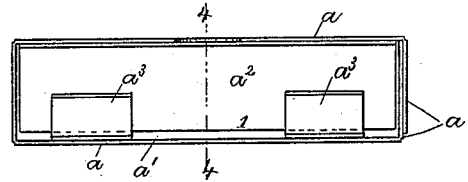
Figure 2:
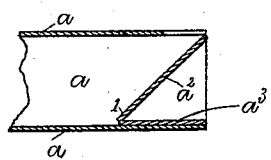
Figure 4:
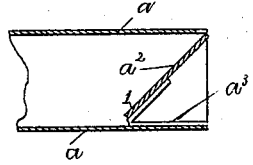
Figure 6:
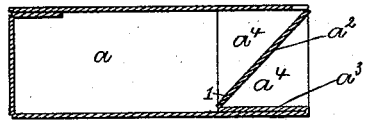
Figure 5:
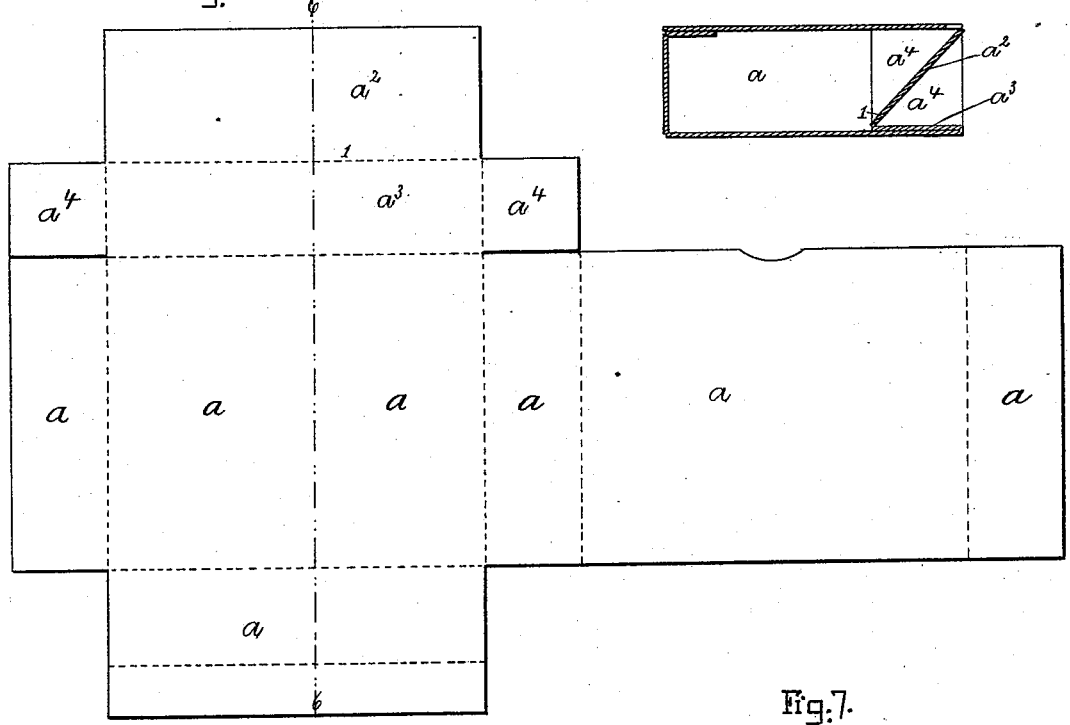
Figure 8:
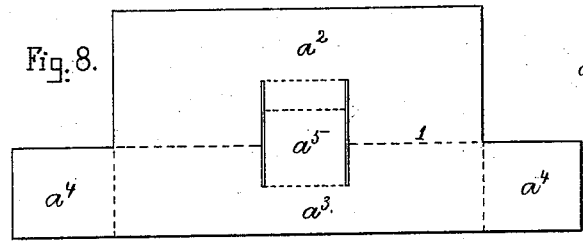
Figure 7:
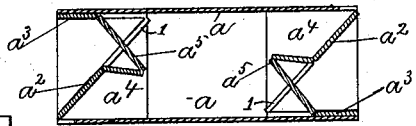

Figure 1 is a view of one side of one form of receptacle embodying my invention, and Fig. 2 is a sectional view on line 2 2 of Fig. 1. Fig. 3 is a view of one side of another form of receptacle embodying my invention, and Fig. 4 is a sectional view on line 4 4 of Fig. 3. Fig. 5 shows a blank of sheet material, from which one form of receptacle embodying my invention is made; and Fig. 6 is a sectional view of a receptacle made from the blank shown in Fig. 5, the section being taken at line 6 6 of Fig. 5. Fig. 7 is a sectional view of another form of my new lid mounted in a receptacle, and Fig. 8 is a plan of one form of my new lid provided with a let-off.

My invention is a spring-lid of peculiar construction adapted to close a box or other receptacle.

In the drawings, in which I show my invention embodied in a form especially suited for use as a cigarette-box, $a$ is the receptacle or box and $a^2$ its lid, which automatically closes the mouth of the receptacle. The lid is provided with one or more lips, $a^3$, secured to the receptacle $a$, and is mounted with its end within the receptacle, whereby the natural springiness of the lid and its lip or lips, or of the lips alone, is made use of to automatically return the lid into place to close the mouth of the receptacle after the lid has been pressed back to open the mouth $a'$ and has been relieved from pressure.

In Figs. 1 and 2 the lid $a^2$ is provided with one lip, $a^3$, which is integral with the lid, and this lip is secured to the receptacle.

In Figs. 3 and 4 lid $a^2$ has a number of lips, $a^3$, which are not integral with the lid; but, as shown in all these figures, the lips connect the lid to the receptacle, and the lid is a spring-controlled lid, the spring in Figs. 1 and 2 being partly in the lid and partly in the lip, while in Figs. 3 and 4 it is wholly in the lips.

I ordinarily make my new lids of strawboard, and one form of box provided with my lid may be readily made from the blank shown in Fig. 5, as will be readily understood by all skilled in the art. In this form the lip $a^3$ is integral with one side of receptacle $a$, and is provided with ears $a^4$, which, when folded as shown in Fig. 6, keep the lid and lip in position without pasting the lip in place, as in Figs. 1, 2, 3, and 4.

It will be plain to all skilled in the art that my new lid may be combined with receptacles of various forms—regular and irregular.

In Fig. 7 my lid is provided with a projection or let-off, $a^5$, which lies in the path of an article moving from the receptacle. When this feature of my invention is embodied in a cigarette-box, for example, this projection or let-off prevents more than one cigarette coming out at a time. The box shown in Fig. 7 is provided with two of my lids provided with let-offs $a^5$, and it is desirable in some cases that receptacles be thus constructed.

What I claim is—

1. The combination of a receptacle, $a$, with a spring-controlled lid, $a^2$, having one or more lips, $a^3$, the lid $a^2$ being secured in place with one end within the receptacle $a$, substantially as and for the purpose set forth.

2. The herein-described combination of receptacle $a$ and spring-controlled lid $a^2$, the lid having a let-off, $a^5$, projecting from that surface which is toward the chamber of the receptacle when the lid is closed, substantially as and for the purpose set forth.

CHARLES WINTERBON ELLIOTT.

Witnesses:
EDWARD S. BEACH,
JOHN R. SNOW.